US010445511B2

(12) United States Patent
Okamoto

(10) Patent No.: US 10,445,511 B2
(45) Date of Patent: Oct. 15, 2019

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Minato-ku, Tokyo (JP)

(72) Inventor: Naoki Okamoto, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 631 days.

(21) Appl. No.: 14/487,362

(22) Filed: Sep. 16, 2014

(65) Prior Publication Data
US 2015/0234574 A1 Aug. 20, 2015

(30) Foreign Application Priority Data
Feb. 19, 2014 (JP) .................................. 2014-029570

(51) Int. Cl.
*G06F 21/60* (2013.01)

(52) U.S. Cl.
CPC .................................. *G06F 21/604* (2013.01)

(58) Field of Classification Search
CPC .................................................. G06F 21/604
See application file for complete search history.

(56) References Cited

U.S. PATENT DOCUMENTS

| 5,107,443 A * | 4/1992 | Smith ..................... G06Q 10/10 |
| | | 713/166 |
| 5,745,711 A * | 4/1998 | Kitahara ............. G06F 3/04842 |
| | | 715/753 |
| 5,995,096 A * | 11/1999 | Kitahara ............. G06F 3/04842 |
| | | 348/E7.083 |
| 5,996,003 A | 11/1999 | Namikata et al. |

(Continued)

FOREIGN PATENT DOCUMENTS

| JP | 06-332819 A | 12/1994 |
| JP | 9-101767 A | 4/1997 |

(Continued)

OTHER PUBLICATIONS

Communication dated May 30, 2017, issued from the Japan Patent Office in counterpart Japanese Patent Application No. 2014-029570.

*Primary Examiner* — Ryan Barrett
(74) *Attorney, Agent, or Firm* — Sughrue Mion, PLLC

(57) ABSTRACT

An information processing apparatus includes a setting unit, an extracting unit, a transmitting unit, a receiving unit, and a display. The setting unit sets, in a first area that displays thumbnails, a second area that includes a thumbnail that is open to a person concerned among the thumbnails. The extracting unit extracts a thumbnail displayed in the second area. The transmitting unit transmits information on the thumbnail extracted by the extracting unit to an information processing apparatus used by the person concerned. The receiving unit receives information on a thumbnail that is open, from the information processing apparatus used by the (Continued)

person concerned. The display displays, in a third area, the thumbnail displayed in the second area and a thumbnail based on the information received by the receiving unit.

13 Claims, 6 Drawing Sheets

(56) References Cited

U.S. PATENT DOCUMENTS

| | | | | |
|---|---|---|---|---|
| 8,214,747 | B1* | 7/2012 | Yankovich | G06F 9/4451 |
| | | | | 715/751 |
| 2003/0037109 | A1* | 2/2003 | Newman | H04L 12/4633 |
| | | | | 709/204 |
| 2003/0065722 | A1* | 4/2003 | Ieperen | G06F 21/31 |
| | | | | 709/205 |
| 2003/0120734 | A1* | 6/2003 | Kagan | G06F 17/30864 |
| | | | | 709/206 |
| 2004/0181796 | A1* | 9/2004 | Fedotov | G06F 3/1454 |
| | | | | 719/323 |
| 2006/0146765 | A1* | 7/2006 | Van De Sluis | G06F 3/016 |
| | | | | 370/338 |
| 2007/0113190 | A1* | 5/2007 | Clark | G06F 9/4445 |
| | | | | 715/748 |
| 2007/0174487 | A1* | 7/2007 | Busey | G06F 17/30067 |
| | | | | 709/246 |
| 2007/0294632 | A1* | 12/2007 | Toyama | G06F 3/038 |
| | | | | 715/764 |
| 2009/0205049 | A1* | 8/2009 | Chakra | G06F 21/6218 |
| | | | | 726/26 |
| 2009/0217177 | A1* | 8/2009 | DeGrazia | G06F 3/0481 |
| | | | | 715/753 |
| 2009/0307604 | A1* | 12/2009 | Giles | G06F 21/604 |
| | | | | 715/751 |
| 2010/0262925 | A1* | 10/2010 | Liu | G06Q 10/10 |
| | | | | 715/759 |
| 2010/0313239 | A1* | 12/2010 | Chakra | G06F 21/6218 |
| | | | | 726/2 |
| 2011/0078573 | A1* | 3/2011 | Ooba | G06F 9/4443 |
| | | | | 715/733 |
| 2012/0222132 | A1* | 8/2012 | Burger | G06F 21/604 |
| | | | | 726/28 |
| 2012/0290943 | A1* | 11/2012 | Toney | G06Q 10/101 |
| | | | | 715/751 |
| 2013/0117699 | A1* | 5/2013 | Branson | G06F 3/0488 |
| | | | | 715/769 |
| 2015/0070558 | A1* | 3/2015 | Okamori | H04N 5/23293 |
| | | | | 348/333.1 |

FOREIGN PATENT DOCUMENTS

| | | |
|---|---|---|
| JP | 2004-56551 A | 2/2004 |
| JP | 3494451 B2 | 2/2004 |
| JP | 2011-186818 A | 9/2011 |
| WO | 2013/011863 A1 | 1/2013 |

* cited by examiner

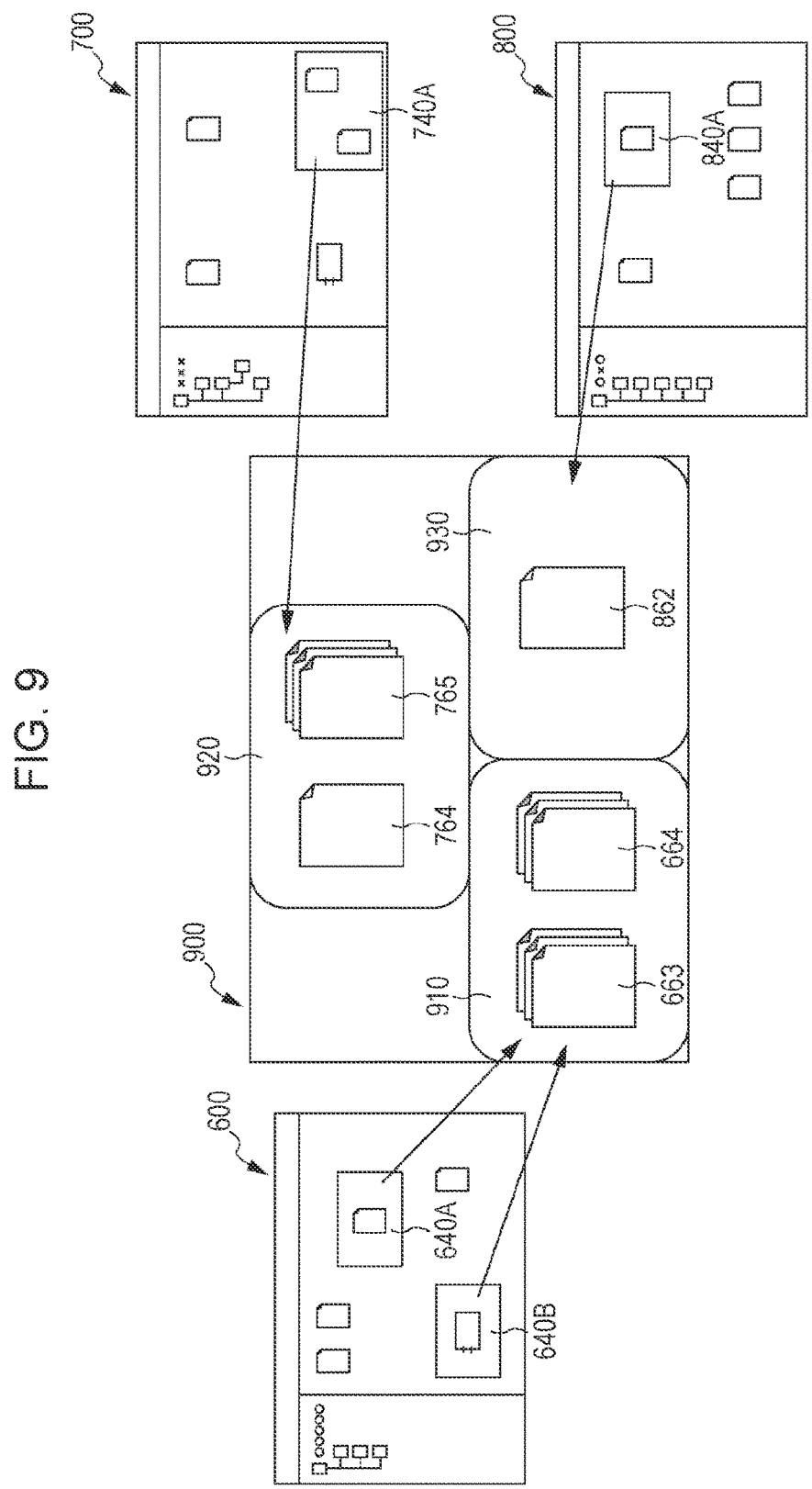

FIG. 10

| SELECTED AREA (COORDINATES) | INDIVIDUAL DESK NAME | DISCLOSURE DESK NAME |
|---|---|---|
| 0,0,100,100 | A NO. 1 | DISCLOSURE DESK A |
| 400,500,1000,800 | A NO. 1 | DISCLOSURE DESK B |
| 200,300,500,500 | A NO. 1 | DISCLOSURE DESK A |
| 1200,1300,1500,1500 | A NO. 2 | DISCLOSURE DESK C |
| 70,100,1700,700 | A NO. 3 | DISCLOSURE DESK A |

FIG. 11

| DOCUMENT NAME | THUMBNAIL INFORMATION | AUTHORIZED DISCLOSURE | USER NAME | INDIVIDUAL DESK NAME |
|---|---|---|---|---|
| ESTIMATE 1 | 3/25/2013 10:50 | SHARED | A | A NO.1 |
| APPLICATION 1 | 3/25/2013 11:00 | READ ONLY | A | A NO.1 |
| APPLICATION 2 | 3/26/2013 12:00 | READ ONLY | A | A NO.2 |
| ESTIMATE 2 | 3/27/2013 10:50 | SHARED | A | A NO.2 |

FIG. 12

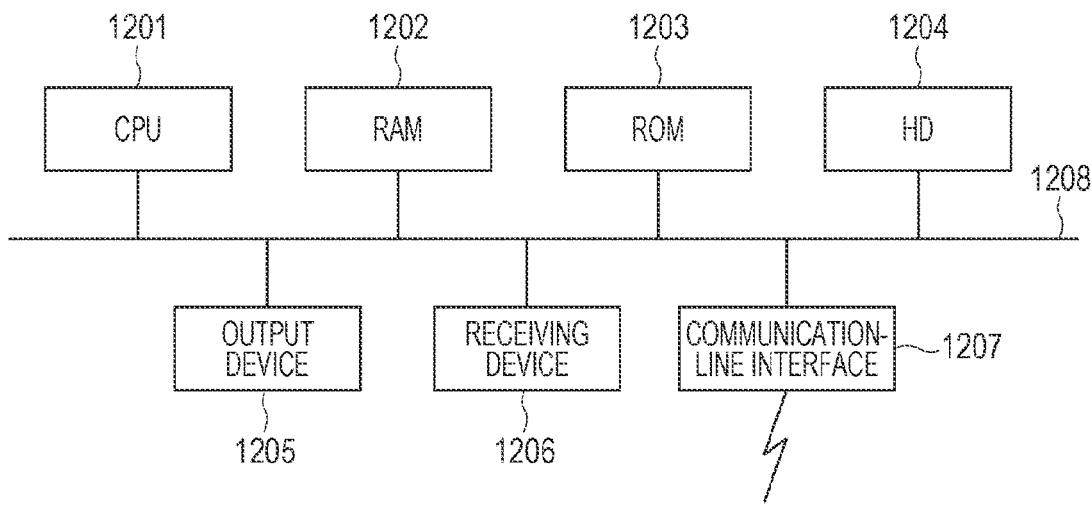

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-029570 filed Feb. 19, 2014.

BACKGROUND

Technical Field

The present invention relates to an information processing apparatus, an information processing method, and a non-transitory computer readable medium.

SUMMARY

According to an aspect of the invention, there is provided an information processing apparatus including a setting unit, an extracting unit, a transmitting unit, a receiving unit, and a display. The setting unit sets, in a first area that displays thumbnails, a second area that includes a thumbnail that is open to a person concerned among the thumbnails. The extracting unit extracts a thumbnail displayed in the second area. The transmitting unit transmits information on the thumbnail extracted by the extracting unit to an information processing apparatus used by the person concerned. The receiving unit receives information on a thumbnail that is open, from the information processing apparatus used by the person concerned. The display displays, in a third area, the thumbnail displayed in the second area and a thumbnail based on the information received by the receiving unit.

BRIEF DESCRIPTION OF THE DRAWINGS

An exemplary embodiment of the present invention will be described in detail based on the following figures, wherein:

FIG. 9 is a diagram illustrating an example of processing according to the exemplary embodiment;

FIG. 10 is a diagram illustrating an example of a data structure of a shared area setting table;

FIG. 11 is a diagram illustrating an example of a data structure of a shared area document management table; and FIG. 12 is a block diagram illustrating an example of a hardware configuration of a computer that realizes the exemplary embodiment.

DETAILED DESCRIPTION

In the following, an example of an exemplary embodiment for realizing the present invention will be described with reference to the drawings.

Figure 1:
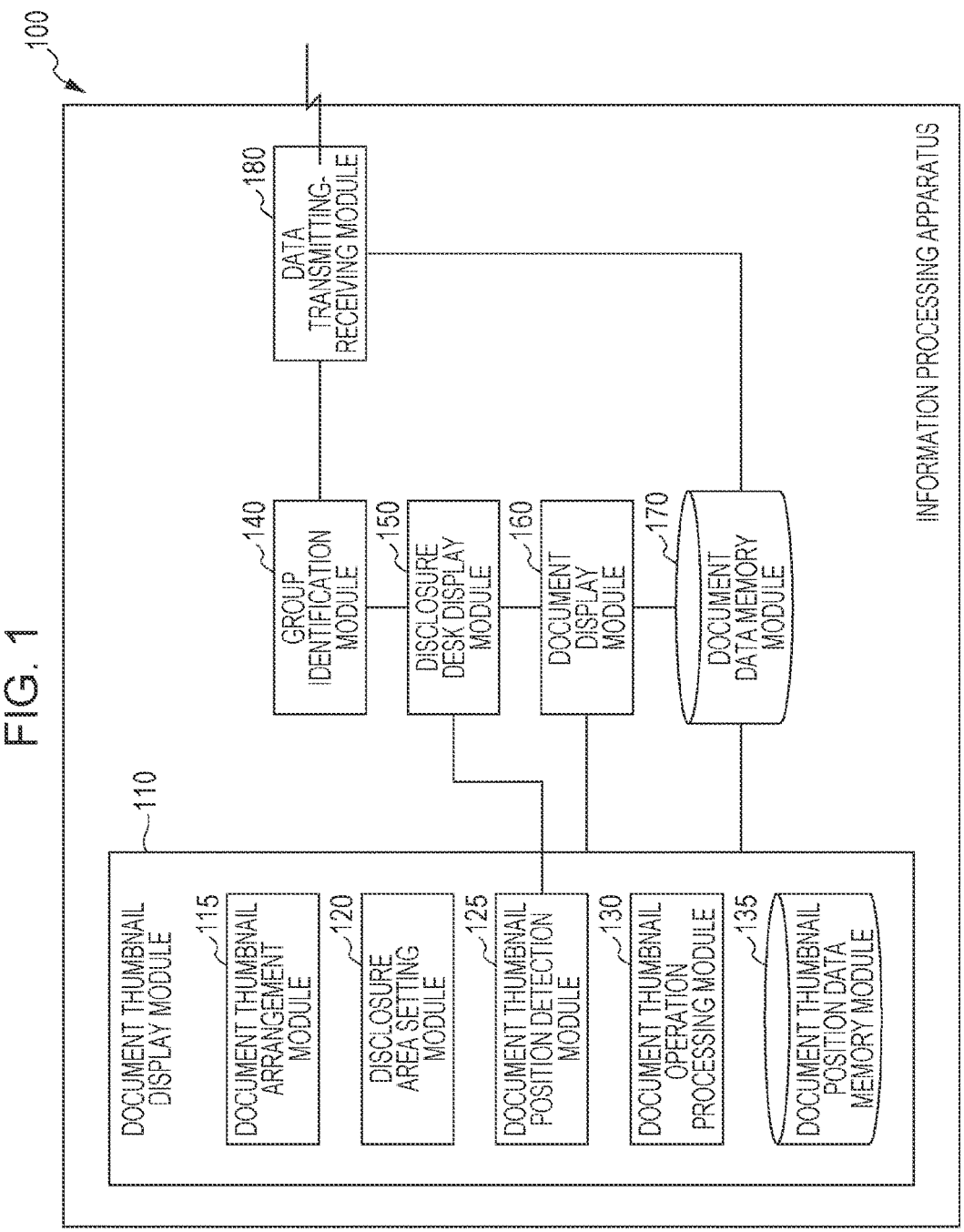
FIG. 1 is a schematic module configuration diagram in an exemplary configuration of an exemplary embodiment.

FIG. 1 illustrates a schematic module configuration diagram in an exemplary configuration of the exemplary embodiment.

Note that a module indicates a part such as a software product (a computer program), a hardware product, and the like that may be a generally logically separable part. Thus, modules according to the exemplary embodiment include not only modules serving as computer programs but also modules having a hardware configuration. Thus, the exemplary embodiment also describes computer programs that function as these modules (a program for causing a computer to execute each process, a program for causing a computer to function as each unit, and a program for causing a computer to realize each function), a system, and a method. Note that, for convenience' sake in terms of description, "store", "cause . . . to store" and expressions similar to "store" and "cause . . . to store" are used. These expressions mean that, in the case where the exemplary embodiment is a computer program, "cause a memory to store" or "performs control such that a memory is caused to store". There may be a one-to-one correspondence between modules and functions. When modules are mounted, one module may be configured by one program or plural modules may be configured by one program. Alternatively, one module may be configured by plural programs. Moreover, plural modules may be executed by a computer or one module may be executed by plural computers, which are computers in a distributed environment or a parallel processing environment. Note that one module may include another module. In addition, in the following, "connection" may be used for a physical connection and also for a logical connection (giving and receiving of data, instructions, a reference relationship between data, and the like). "Predetermined" refers to something that has been determined before a target process, and also refers to something that has been determined not only before a process according to the exemplary embodiment starts but also after the process according to the exemplary embodiment starts and before a target process starts, depending on a status or a state at that point in time or a status or a state until that point in time. In the case where there are plural "predetermined values", the predetermined values may differ from one another or two or more of the predetermined values (as a matter of course, including all the predetermined values) may be the same. In addition, a description meaning "in the case of A, B is performed" is used to mean that "It is determined whether or not . . . is A. When it is determined that . . . is A, B is performed". Note that cases where a determination as to whether or not . . . is A is unnecessary are excluded.

In addition, a system or an apparatus may be configured by connecting plural computers, hardware devices, apparatuses, and the like through a communication unit such as a network (including one-to-one correspondence communication connection) and may also be realized by one computer, a hardware device, an apparatus, or the like. An "apparatus" and a "system" are used as words having the same meaning.

As a matter of course, the "system" does not include just a social "mechanism" (a social system), which is man-made arrangement.

For each process performed by each module or for each process in the case where plural processes are performed in a module, subject information is read from a memory. After the process, a processing result is written into the memory. Thus, a description of reading from the memory before a process and a description of writing to the memory after a process may be omitted. Note that here a memory may include a hard disk, a random-access memory (RAM), an external storage medium, a memory connected through a communication line, a register in a central processing unit (CPU) and the like.

An information processing apparatus 100 according to the exemplary embodiment displays a reduced image of a document. As illustrated in an example of FIG. 1, the information processing apparatus 100 includes a document thumbnail display module 110, a group identification module 140, a disclosure desk display module 150, a document display module 160, a document data memory module 170, and a data transmitting-receiving module 180.

The information processing apparatus 100 specifies documents to be open to those concerned among documents personally owned by an individual. Here, those concerned have only to be persons to whom documents need to be open. For example, those concerned may be members attending a meeting other than an operator, members of a group other than the operator, the operator belonging to the group, and the like. In the following, a description is made supposing that, for example, those concerned are attendees of a meeting (an operator A, an operator B, and an operator C) and a document is a document used in the meeting.

The document thumbnail display module 110 includes a document thumbnail arrangement module 115, a disclosure area setting module 120, a document thumbnail position detection module 125, a document thumbnail operation processing module 130, and a document thumbnail position data memory module 135. The document thumbnail display module 110 is connected to the document display module 160 and the document data memory module 170.

The document thumbnail arrangement module 115 arranges reduced images of documents personally owned by an operator (hereinafter also referred to as thumbnails) in a first area that displays the reduced images of the documents, in accordance with an operation performed by the operator. Note that an "operation performed by an operator" indicates an operation performed using a user interface such as a keyboard, a mouse, a touch panel, and the like. For example, in accordance with an operation using a mouse or the like, a reduced image of a document is selected, and then moved or copied (hereinafter simply referred to as moved), or the like. A "document personally owned by an operator" is a document that at least the operator has rights such as a read right, an edit right, and a delete right as access rights for the document. As a typical example, a document created by the operator corresponds to such a document.

The disclosure area setting module 120 sets, in the first area where the reduced images of the documents personally owned by the operator are displayed, a second area that includes a reduced image of a document that is open to those concerned among the documents. The first area is an area where the reduced images of the documents personally owned by the operator are displayed, and is realized by a document management program or the like. The second area is an area for specifying a document that is to be open to those concerned. For example, the second area is set in accordance with an instruction of an operator (a rectangular area by specifying one of four corners of a rectangular is specified and then a diagonally opposite corner, or the like). Documents in the second area are documents that are open to those concerned. That is, the documents are documents for which access rights are given to those concerned. For example, by moving documents to a folder that may be accessed by those concerned, or the like, the documents are made open to those concerned.

Figure 6:
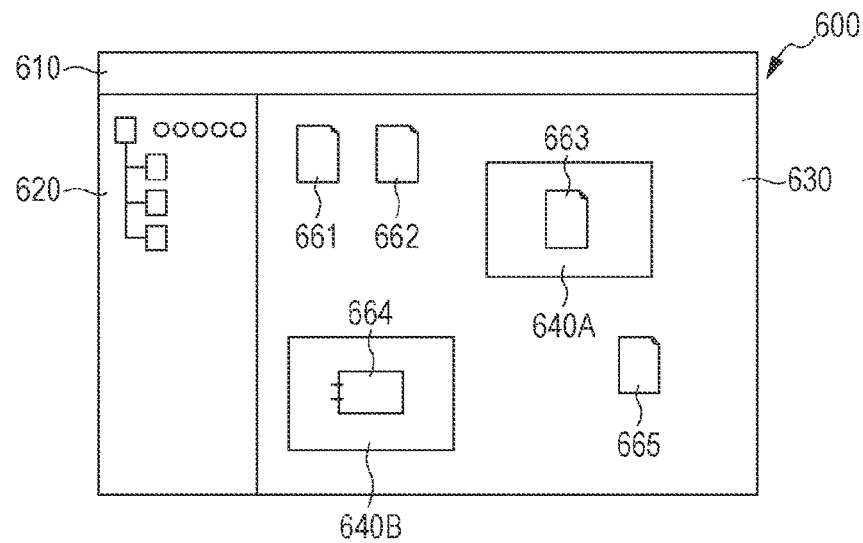
FIG. 6 is a diagram illustrating an example of processing according to the exemplary embodiment.

A specific example of such an area is described using an example of FIG. 6. FIG. 6 is a diagram illustrating an example of processing according to the exemplary embodiment. A document thumbnail display area 600 displayed on a display device such as a liquid crystal display or the like of the information processing apparatus 100 is an area where display is performed by performing a process such as a document management program. The document thumbnail display area 600 includes a menu display area 610, a folder display area 620, and a workspace area 630. The menu display area 610 is an area where a menu is displayed for operations that may be performed for documents or the like. The folder display area 620 is an area where the structure of folders is displayed, which is a tree structure. For example, in the case where a folder is selected in accordance with an operation of an operator, documents or the like included in the folder are displayed in the workspace area 630. The workspace area 630 is an example of the above-described first area. That is, the workspace area 630 is an area where thumbnails of documents personally owned by the operator are displayed. For example, in FIG. 6, five documents in a subject folder are displayed. The five documents are a document 661, a document 662, a document 663, a document 664, and a document 665. Here, the workspace area 630 is an area imitating a desktop. Documents may be arranged in the workspace area 630 such that the documents are aligned on a desk. That is, documents may be arranged freely in accordance with an operation of the operator in the workspace area 630.

A disclosure area 640A and a disclosure area 640B are set in accordance with operations of an operator. The disclosure area 640A is an area created so as to include the document 663 as a document that is open to those concerned. The disclosure area 640B is an area created so as to include the document 664 as a document that is open to those concerned. Thus, the documents 663 and 664 are documents that are open to those concerned and the other documents (the documents 661, 662, and 665) are documents that are not open to those concerned. In this manner, by creating disclosure areas in the workspace area 630, for example, documents to be used in a meeting (documents that are open to those concerned) are separated from the other documents (documents that are not open to attendees of the meeting).

Figure 7:
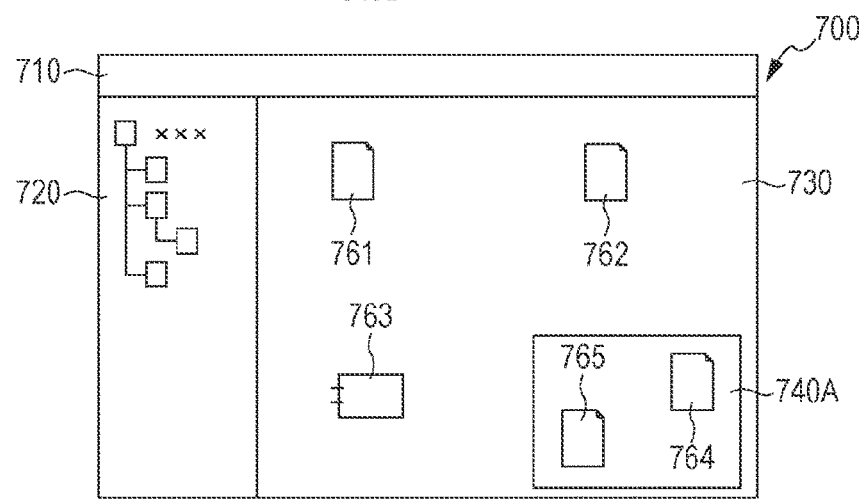
FIG. 7 is a diagram illustrating an example of processing according to the exemplary embodiment.
Figure 8:
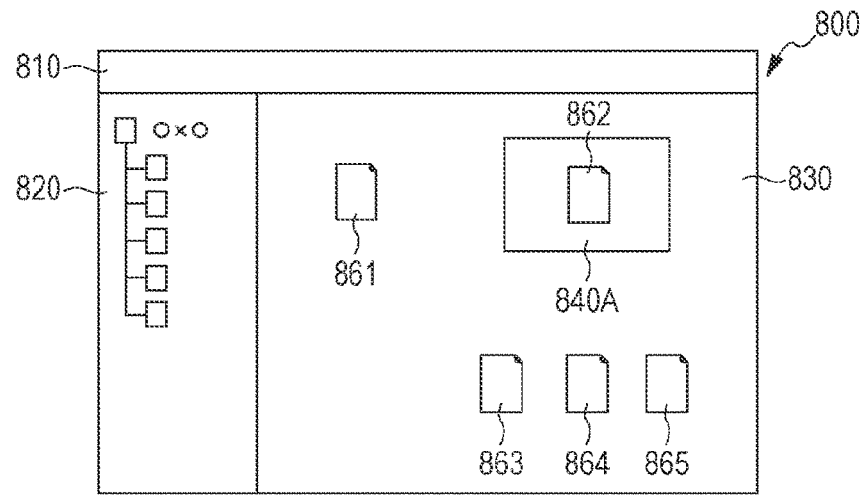
FIG. 8 is a diagram illustrating an example of processing according to the exemplary embodiment.

Note that a document thumbnail display area 700 illustrated in an example of FIG. 7, a document thumbnail display area 800 illustrated in an example of FIG. 8, are displayed on the information processing apparatuses 100 of operators B and C. The information processing apparatuses 100 of the operators B and C differ from that of the operator A illustrated in the example of FIG. 6. Suppose that the operators A, B, and C are attendees of the same meeting. That is, the operators A, B, and C are those concerned. The document thumbnail display areas 700 and 800 have a configuration similar to that of the document thumbnail display area 600 illustrated in the example of FIG. 6. In the example of FIG. 7, a document 764 and a document 765 are included in a disclosure area 740A in accordance with an operation of the operator B. That is, the documents 764 and 765 are documents that are open to those concerned and documents 761, 762, and 763 are documents that are not open to those concerned. In the example of FIG. 8, a document 862 is included in a disclosure area 840A in accordance with an operation of the operator C. That is, the document 862 is a document that is open to those concerned and documents 861, 863, 864, and 865 are documents that are not open to those concerned. Thus, the documents 663, 664, 764, 765, and 862 are specified as documents that are open to the operators A, B, and C.

In addition, in the case where a document is additionally made open during a meeting, an operator has only to newly create a second area so as to include the document or has only to move the document into a second area.

The document thumbnail position detection module 125 is connected to the disclosure desk display module 150 and extracts a document displayed in the second area. In the above-described examples illustrated in FIGS. 6, 7, and 8, the document 663 is extracted from the disclosure area 640A, the document 664 is extracted from the disclosure area 640B, the documents 764 and 765 are extracted from the disclosure area 740A, and the document 862 is extracted from the disclosure area 840A.

The document thumbnail operation processing module 130 sets a disclosure level for a document displayed in the second area in accordance with an operation performed for the document. For example, in the case where the second area is set and then a document is moved into the second area, a disclosure level for the document (authorized disclosure for the document) is set as copy not allowed (read only). For example, in the above-described examples, in the case where the operator A has moved the document 661 into the disclosure area 640A, the operator B is allowed to read the document 661 but not allowed to copy the document 661 into a workspace area 730. In addition, in the case where only some pages of a document that are made open are displayed and then an operation is performed to move the document into a disclosure area, only the displayed pages of the document may be made open. In order to do this, an operation history is stored for each document and an operation history of a document moved into a disclosure area is extracted. In the case where the operation history matches a condition as descried above, a disclosure level corresponding to the condition is set for the document.

The document thumbnail position data memory module 135 stores the positions of documents in the first area, the position of the second area in the first area, the positions of documents in the second area, and the like. Specifically, in the example of FIG. 6, the document thumbnail position data memory module 135 stores the coordinate positions of the documents 661 to 665 in the workspace area 630, the coordinate positions of the disclosure areas 640A and 640B, the coordinate position of the document 663 in the disclosure area 640A, and the coordinate position of the document 664 in the disclosure area 640B.

The group identification module 140 is connected to the disclosure desk display module 150 and the data transmitting-receiving module 180. The group identification module 140 transmits information on a document extracted by the document thumbnail position detection module 125 to information processing apparatuses of those concerned (an information processing apparatus 100B to be described later with FIG. 2, and the like) via the data transmitting-receiving module 180. That is, about a document set by a certain information processing apparatus 100 as a document that may be open, other information processing apparatuses 100 are notified that the other information processing apparatuses 100 may also read the document. Information on documents that are open is received from the other information processing apparatus 100 via the data transmitting-receiving module 180. That is, information on documents set by the other information processing apparatus 100 as documents that may be open is obtained. Note that "information on a document" may be the document itself, or corresponds to attributes such as the position where the document is stored (a uniform resource locator (URL) or the like), a thumbnail of the document, the name of the document, and the like.

The disclosure desk display module 150 is connected to the document thumbnail position detection module 125 of the document thumbnail display module 110, the group identification module 140, and the document display module 160. The disclosure desk display module 150 displays, in a third area, a reduced image of a document displayed in the second area and a reduced image of a document received by the group identification module 140. Documents that are open are collected and displayed in the third area. That is, in the above-described examples, the third area is an area where thumbnails of documents to be used for the meeting are displayed. A description is made using a disclosure desk 900 illustrated in an example of FIG. 9. FIG. 9 is a diagram illustrating an example of processing according to the exemplary embodiment. The group identification module 140 provides fourth areas for those concerned in the disclosure desk 900, which is the third area. Each fourth area is provided for a corresponding person concerned among those concerned. For each fourth area, the group identification module 140 displays thumbnails of documents made open by the person concerned corresponding to the fourth area. The disclosure desk 900 is displayed on display devices of the information processing apparatuses 100 owned by those concerned. That is, for each information processing apparatus 100, the identical disclosure desk 900 is displayed. Specifically, the disclosure desk 900 is divided into three fourth areas, which are a disclosure area 910 of an information processing apparatus 100A of the operator A, a disclosure area 920 of the information processing apparatus 100B of the operator B, and a disclosure area 930 of an information processing apparatus 100C of the operator C. Names of persons who have made documents open are displayed in the disclosure area 910 of the information processing apparatus 100A or the like. The document 663 included in the disclosure area 640A and the document 664 included in the disclosure area 640B are displayed in the disclosure area 910 of the information processing apparatus 100A. The documents 764 and 765 included in the disclosure area 740A are displayed in the disclosure area 920 of the information processing apparatus 100B. The document 862 included in the disclosure area 840A is displayed in the disclosure area 930 of the information processing apparatus 100C.

The document display module 160 is connected to the document thumbnail display module 110, the disclosure desk display module 150, and the document data memory module 170. In accordance with an operation of an operator, a thumbnail of a document displayed by the disclosure desk display module 150 or the document thumbnail display module 110 is selected and the content of the document is displayed on a display device. In the above-described examples, a document being used in the meeting may be displayed on the information processing apparatus 100 of a subject user or a document that is not open may also be displayed.

The document data memory module 170 is connected to the document thumbnail display module 110, the document display module 160, and the data transmitting-receiving module 180. The document data memory module 170 stores documents personally owned by an operator and documents made open by other operators. In addition, the document data memory module 170 may also store thumbnails of the documents.

The data transmitting-receiving module 180 is connected to the group identification module 140 and the document data memory module 170. The data transmitting-receiving module 180 is connected to the other information processing apparatuses 100 through communication lines. In the above-described examples, the data transmitting-receiving module 180 may communicate with the information processing apparatuses 100 owned by the operators B and C, who are attendees of the meeting. The data transmitting-receiving module 180 may also communicate with a server that manages attendees of the meeting or the like.

Figure 2:
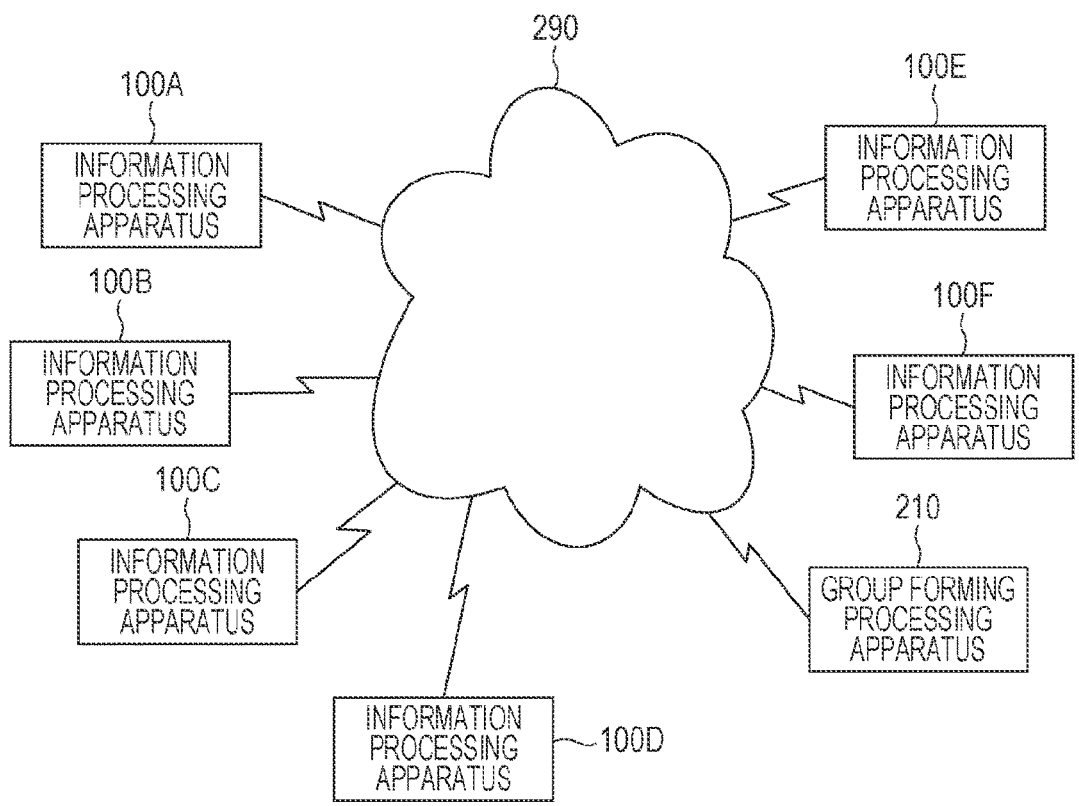
FIG. 2 is a diagram illustrating an example of a system configuration that realizes the exemplary embodiment.

FIG. 2 is a diagram illustrating an example of a system configuration that realizes the exemplary embodiment. The information processing apparatuses 100A, 100B, and 100C, information processing apparatuses 100D, 100E, and 100F, and a group forming processing apparatus 210 are connected to each other through communication lines 290. Each information processing apparatus 100 has a module configuration illustrated in the example of FIG. 1. In the above-described examples, the information processing apparatuses 100A, 100B, and 100C are owned by attendees A, B, and C of the meeting, respectively. In addition, the group forming processing apparatus 210 forms a group of plural persons, and specifies group members to whom documents may be open in the exemplary embodiment. That is, IDs (identification) of group members or IDs of information processing apparatuses that the group members have are received in accordance with a command from the group forming processing apparatus 210, and then information on a document that is open has only to be transmitted using IDs as destinations.

In addition, the group forming processing apparatus 210 may create plural groups. In addition, group members may belong to plural groups. Thus, there may be a case where an operator belongs to plural groups. In that case, a group (a group ID) to which a document is open is specified and then a disclosure area has only to be specified. Giving and receiving of documents that are open are performed through the communication lines 290 among the information processing apparatuses 100 of group members of each group.

Note that the group forming processing apparatus 210 may form a group in accordance with settings for attendees or may also form a group by detecting the information processing apparatuses 100 of attendees in a meeting room using a sensor provided in the meeting room. Alternatively, the group forming processing apparatus 210 may form a group by detecting the strength of a wireless signal from a certain information processing apparatus 100 to other information processing apparatuses 100 and recognizing the other information processing apparatuses 100 nearby in accordance with the strength of the wireless signal.

Figure 3:
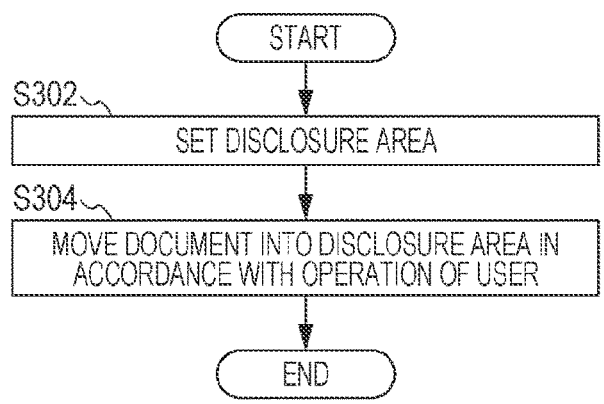
FIG. 3 is a flowchart illustrating an example of a process according to the exemplary embodiment.

FIG. 3 is a flowchart illustrating an example of a process according to the exemplary embodiment.

In step S302, the disclosure area setting module 120 sets a disclosure area so as to include documents that are disclosure targets and included in a workspace in accordance with an operation of a user. Specifically, as described above, the disclosure areas 640A and 640B in the example of FIG. 6 are set. The disclosure areas are managed by, for example, a shared area setting table 1000. FIG. 10 is a diagram illustrating an example of a data structure of the shared area setting table 1000. The shared area setting table 1000 includes a selected area (coordinate) column 1010, an individual desk name column 1020, and a disclosure desk name column 1030. The selected area (coordinate) column 1010 stores coordinates of a selected area (a disclosure area). For example, coordinates of a selected area may be x- and y-coordinates of the upper left corner and the lower right corner of a rectangular area, or may also be x- and y-coordinates of the upper left corner, the width, the height, and the like of the rectangular area. The individual desk name column 1020 stores individual desk names. Specifically, in the exemplary embodiment, what is stored in the individual desk name column 1020 has to be at least information that may uniquely identify the workspace area 630. The disclosure desk name column 1030 stores disclosure desk names. In the above-described examples, a disclosure desk name is used to specify the disclosure desk 900. As a result, the workspace area 630 and the disclosure desk 900 are associated with each other.

In step S304, the document thumbnail arrangement module 115 moves a document into the disclosure area in accordance with an operation of the user. Note that processing in step S304 does not have to be performed. In addition, as described above, in the case where a document has been moved into the disclosure area, the disclosure level for the document may be set to copy not allowed.

Figure 4:
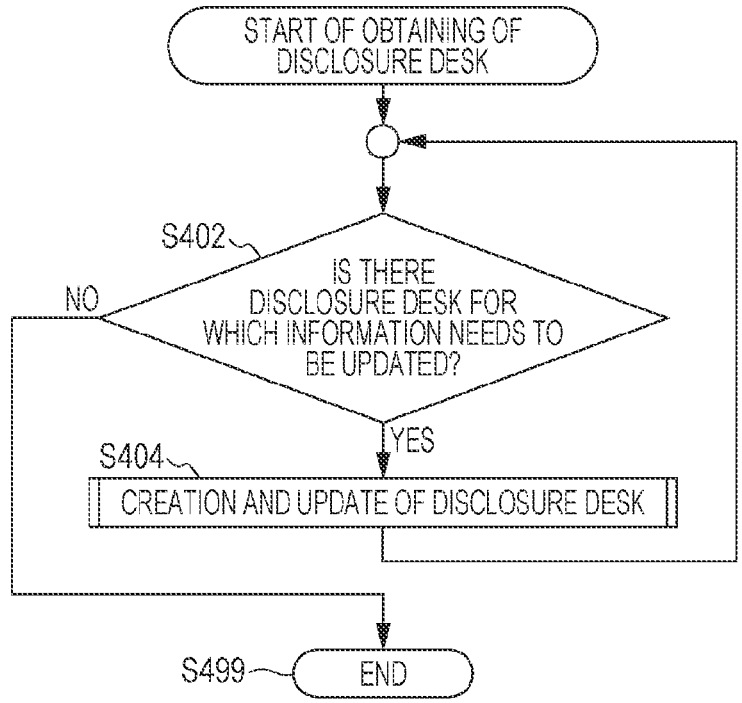
FIG. 4 is a flowchart illustrating an example of a process according to the exemplary embodiment.

FIG. 4 is a flowchart illustrating an example of a process (a process for obtaining a disclosure desk) according to the exemplary embodiment.

In step S402, the group identification module 140 determines whether or not there is a disclosure desk for which information needs to be updated. When it is determined that there is such a disclosure desk, the process proceeds to step S404. Otherwise, the process ends (step S499). In the case where information on a document that is open is transmitted from the information processing apparatus 100 of another group member, in the case where a new disclosure area is set in the information processing apparatus 100, which is a subject information processing apparatus 100, or in the case where a new document is added to the disclosure area in the subject information processing apparatus 100, it is determined that it is the "case where there is a disclosure desk for which information needs to be updated". In addition, the time and date (which may be represented by year, month, day, hour, minute, second, a unit shorter than a second, or a combination therefrom) at which a meeting starts is extracted from schedule information and in the case where the current time is in a predetermined period before the time and date at which the meeting starts, a disclosure desk may be displayed or updated.

In step S404, a disclosure desk is created and updated. The details of a process for creating and updating a disclosure desk will be described using a flowchart illustrated in an example of FIG. 5.

Figure 5:
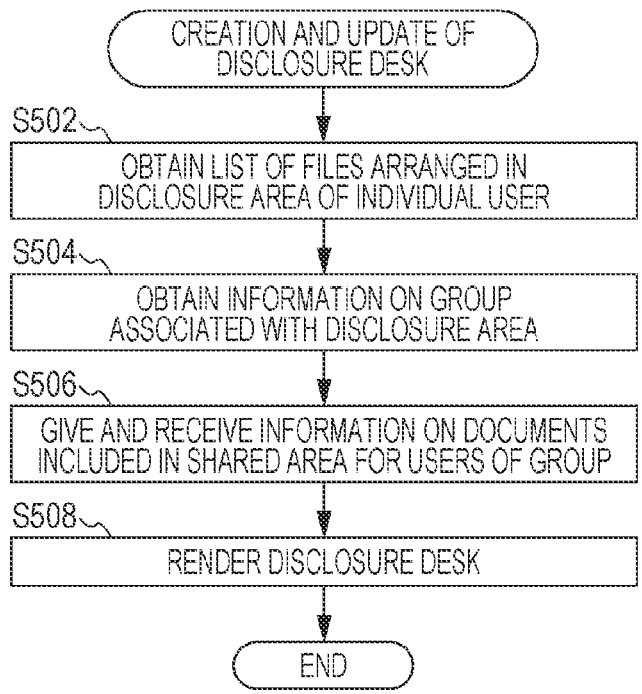
FIG. 5 is a flowchart illustrating an example of a process according to the exemplary embodiment.

FIG. 5 is a flowchart illustrating an example of a process (the process for creating and updating a disclosure desk) according to the exemplary embodiment.

In step S502, the document thumbnail position detection module 125 obtains a list of files arranged in a disclosure area of an individual user. That is, documents included in the disclosure area are extracted. Specifically, shared area document management tables 1100 are received from the information processing apparatuses 100 of other group members. Similarly, a shared area document management table 1100 is transmitted from the subject information processing apparatus 100 to the information processing apparatuses 100 of the other group members. FIG. 11 is a diagram illustrating an example of a data structure of the shared area document management table 1100. The shared area document management table 1100 includes a document name column 1110, a thumbnail information column 1120, an authorized disclosure column 1130, a user name column 1140, and an individual desk name column 1150. The document name column 1110 stores names of documents set as disclosure targets, each of the disclosure targets being set by a user corresponding to the disclosure target. The thumbnail information column 1120 store information on thumbnails of the documents. For example, information on a thumbnail of a document may be the time and date at which the thumbnail is created, or the thumbnail itself. The authorized disclosure column 1130 stores information on authorized disclosure for the documents. That is, rights of other persons concerned are illustrated for documents displayed on the disclosure desk 900. Note that the rights for documents made open by a subject user on the disclosure desk 900 may also be applied to the subject user. In the case where the subject user wants to perform an operation for a certain right other than the rights (for example, in the case where the subject user wants to "edit" a document for which "read only" is set, or the like), the subject user has only to perform an operation for the certain right not on a document displayed in the disclosure desk 900 but on a document included in the workspace area 630. The user name column 1140 stores names of users who have made the documents open. The individual desk name column 1150 stores names of original individual desks (the name of the workspace area 630 or the like) at which documents have been specified as disclosure targets.

In step S504, the group identification module 140 obtains information on a group associated with the disclosure area. That is, IDs of group members of the group or IDs of information processing apparatuses of the group members are obtained and used as destinations.

In step S506, the group identification module 140 gives and receives information on documents included in a shared area for users of the group. That is, the information on documents is transmitted to the destinations obtained in step S504, and each information processing apparatus 100 receives the information.

In step S508, the disclosure desk display module 150 renders a disclosure desk. That is, a thumbnail of the document is displayed in the disclosure desk 900 illustrated in the example of FIG. 9, in accordance with the received information on the document, which is a disclosure target.

In the above-described examples, the disclosure area 910 of the information processing apparatus 100A or the like in the disclosure desk 900 is set for each user (that is, display is performed so as to clarify, for each document, who has made the document open). However, furthermore, the disclosure area 910 of the information processing apparatus 100A may be divided for disclosure areas 640. Specifically, the disclosure area 910 of the information processing apparatus 100A may also be divided into an area for the disclosure area 640A (including the document 663) and an area for the disclosure area 640B (including the document 664).

In addition, operations may be limited for thumbnails of documents in the disclosure desk 900. For example, for the disclosure areas of users on the disclosure desk 900, a thumbnail of a document may be inhibited from moving from one area to another. Specifically, the document 663 included in the disclosure area 910 of the information processing apparatus 100A may be inhibited from moving into an area included in the disclosure area 920 of the information processing apparatus 100B.

Note that, as illustrated in FIG. 12, a hardware configuration of a computer that executes a program serving as the exemplary embodiment is that of a general computer. Specifically, examples of a general computer include a personal computer, a computer that may serve as a server, and the like. That is, as a specific example, a central processing unit (CPU) 1201 is used as a processing unit (an arithmetic unit), and a random-access memory (RAM) 1202, a read-only memory (ROM) 1203, and a HD 1204 are used as a memory. As the HD 1204, for example, a hard disk may be used. The computer includes the CPU 1201, the RAM 1202, the ROM 1203, the HD 1204, an output device 1205, a receiving device 1206, a communication-line interface 1207, and a bus 1208. The CPU 1201 executes a program serving as the document thumbnail display module 110, the document thumbnail arrangement module 115, the disclosure area setting module 120, the document thumbnail position detection module 125, the document thumbnail operation processing module 130, the group identification module 140, the disclosure desk display module 150, the document display module 160, the data transmitting-receiving module 180, and the like. The RAM 1202 stores the program and data. A program for starting up the computer and the like are stored in the ROM 1203. The HD 1204 is a backing storage (or may also be a flash memory or the like). The receiving device 1206 receives data in accordance with a user's operation performed on a keyboard, a mouse, a touch panel, or the like. The output device 1205 is a CRT, an LCD, or the like. The communication-line interface 1207 is a network interface card or the like for connection to a communication network. The bus 1208 is used to connect the CPU 1201, the RAM 1202, the ROM 1203, the HD 1204, the output device 1205, the receiving device 1206, and the communication-line interface 1207 and to perform transmitting and receiving of data. Plural such computers may be connected to each other through a network.

About a computer program according to the above-described exemplary embodiment, a system having the hardware configuration is caused to read the computer program, the software and hardware resources cooperate, and the above-described exemplary embodiment is realized.

Note that the hardware configuration illustrated in FIG. 12 is an exemplary configuration. The exemplary embodiment is not limited to the configuration illustrated in FIG. 12, and has only to have a configuration that may execute modules described in the exemplary embodiment. For example, some of the modules may be configured by a dedicated hardware device (for example, an application-specific integrated circuit (ASIC) or the like). Some of the modules may be provided in an external system and connected through communication lines. Furthermore, plural such systems as illustrated in FIG. 12 may be connected to each other through communication lines and may operate in a cooperation manner. In addition, in particular, some of the modules may also be installed in a home information appliance, a copier, a facsimile, a scanner, a printer, a multifunction machine (an image processing apparatus having two or more functions of a scanner, a printer, a copier, a facsimile, and the like), and the like other than a personal computer.

Note that the described program may also be stored in a recording medium and provided. Furthermore, the program may also be provided using a communication unit. In that case, for example, a program described above may also be considered as an exemplary embodiment, which is a "non-transitory computer readable medium storing a program".

A "non-transitory computer readable medium storing a program" is a computer readable medium which is used to install and execute a program and to distribute a program and in which a program is recorded.

Note that examples of a recording medium include a digital versatile disc (DVD), a compact disc (CD), a Blu-ray (R) Disc, a magneto-optical (MO) disk, a flexible disk (FD), a magnetic tape, a hard disk, a read-only memory (ROM), an electrically erasable programmable read only memory (EE-PROM (R)), a flash memory, a random-access memory (RAM), a Secure Digital (SD) memory card, and the like. Examples of a DVD include "a DVD-R, a DVD-RW, a DVD-RAM, and the like" based on standards developed by the DVD forum and "a DVD+R, a DVD+RW, and the like" based on standards developed by the DVD+RW Alliance. Examples of a CD include a read only memory (a CD-ROM), a CD recordable (CD-R), a CD rewritable (CD-RW), and the like.

The above-described program or a portion of the program may be recorded and saved in the above-described recording medium and provided or the like. In addition, the above-described program or a portion of the program may also be transmitted by performing communication using a transmission medium such as a wired network, a wireless communication network, or a combination of wired and wireless networks used in, for example, a local-area network (LAN), a metropolitan area network (MAN), a wide area network (WAN), the Internet, an intranet, an extranet, and the like. Alternatively, the above-described program or a portion of the program may also be carried by a carrier wave.

Furthermore, the above-described program may be a portion of another program or may also be recorded in a recording medium together with a separate program. In addition, the above-described program may also be divided and recorded in plural recording mediums. In addition, the above-described program may be recorded in any format such as a compressed format, an encrypted format and the like, as long as the above-described program may be reconstructed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A first information processing apparatus comprising:
at least one hardware processor configured to implement:
   a setting unit that sets, in a first area that displays thumbnails, a second area that includes a first thumbnail that is open to a person concerned among the thumbnails;
   an extracting unit that extracts the first thumbnail displayed in the second area;
   a transmitting unit that transmits information on the first thumbnail extracted by the extracting unit to a second information processing apparatus used by the person concerned, the information comprising an operation history of a document of the first thumbnail, and the information controls an access right to the document of the first thumbnail, the access right regarding the person concerned;
   a receiving unit that receives information on a second thumbnail that is open, from the second information processing apparatus used by the person concerned; and
   a display that displays, in a third area, the first thumbnail displayed in the second area and the second thumbnail based on the information received by the receiving unit,
wherein the access right is set to a user of the first information processing apparatus and indicates a first right to the document of the first thumbnail in the third area,
wherein a different access right is set to the user and indicates a second right to the document of the first thumbnail in the second area,
wherein, prior to the first thumbnail being displayed in the third area, the setting unit further stores, in the operation history, which of ones of pages of the document have been opened in the first area, and
wherein, based on the operation history and in response to the first thumbnail being moved to the second area, the setting unit sets, in accordance with pages of the document of the first thumbnail which have been displayed in the first area, the ones of the pages to be made open in the third area.

2. The first information processing apparatus according to claim 1, wherein the setting unit further sets, in accordance with an operation performed on the thumbnail displayed in the second area, a disclosure level for the thumbnail.

3. The first information processing apparatus according to claim 2, wherein the display has, in the third area, fourth areas for those concerned and displays, in each of the fourth areas, a thumbnail made open by the person concerned among those concerned and corresponding to the fourth area.

4. The first information processing apparatus according to claim 1, wherein the display has, in the third area, fourth areas for those concerned and displays, in each of the fourth areas, a thumbnail made open by the person concerned among those concerned and corresponding to the fourth area.

5. The first information processing apparatus according to claim 1, wherein the at least one hardware processor is further configured, in a case and in response to detecting that the document is moved from the first area to the second area, to control the third area to, of the pages of the document, allow display of one or more of first pages and prohibit display of one or more of second pages, and
   wherein the case is that the operation history indicates both that, of the pages of the document, only the one or more of the first pages have been opened in the first area and also that the one or more of the second pages have not been opened in the first area.

6. The information processing apparatus according to claim 1,
   wherein the third area further comprises another thumbnail added to the third area by the second information processing apparatus.

7. An information processing method comprising:
setting, in a first area that displays thumbnails and by a first information processing apparatus, a second area that includes a first thumbnail that is open to a person concerned among the thumbnails;
extracting, by the first information processing apparatus, the first thumbnail displayed in the second area;

transmitting, from the first information processing apparatus, information on the first thumbnail extracted in the extracting to a second information processing apparatus used by the person concerned, the information comprising an operation history of a document of the first thumbnail, and the information controls an access right to the document of the first thumbnail, the access right regarding the person concerned;

receiving, by the first information processing apparatus, information on a second thumbnail that is open, from the second information processing apparatus used by the person concerned; and displaying, in a third area and by the first information processing apparatus, the first thumbnail displayed in the second area and the second thumbnail based on the information received in the receiving, wherein the access right is set to a user of the first information processing apparatus and indicates a first right to the document of the first thumbnail in the third area, wherein a different access right is set to the user and indicates a second right to the document of the first thumbnail in the second area, wherein, prior to the first thumbnail being displayed in the third area, the operation history is stored and comprises which ones of pages of the document have been opened in the first area, and wherein, based on the operation history and in response to the first thumbnail being moved to the second area, the ones of the pages of the document are made to be open in the third area.

8. A non-transitory computer readable medium storing a program causing a computer to execute a process, the process comprising:

setting, in a first area that displays thumbnails and by a first information processing apparatus, a second area that includes a first thumbnail that is open to a person concerned among the thumbnails;

extracting, by the first information processing apparatus, the first thumbnail displayed in the second area;

transmitting, by the first information processing apparatus, information on the first thumbnail extracted in the extracting to a second information processing apparatus used by the person concerned, the information comprising an operation history of a document of the first thumbnail, the operation history controls an access right to the document of the first thumbnail, the access right regarding the person concerned;

receiving, by the first information processing apparatus, information on a second thumbnail that is open, from the second information processing apparatus used by the person concerned; and displaying, in a third area and by the first information processing apparatus, the first thumbnail displayed in the second area and the second thumbnail based on the information received in the receiving, and wherein the access right is set to a user of the first information processing apparatus and indicates a first right to the document of the first thumbnail in the third area, wherein a different access right is set to the user and indicates a second right to the document of the first thumbnail in the second area, wherein, prior to the first thumbnail being displayed in the third area, the operation history is stored and comprises which ones of pages of the document have been opened in the first area, and wherein, based on the operation history and in response to the first thumbnail being moved to the second area, the ones of the pages of the document are made to be open in the third area.

9. The information processing apparatus according to claim 1, wherein the information further restricts the second information processing apparatus to display the ones of the pages indicated by the operation history in response to a determination that the operation history indicates that the ones of the pages have been displayed by the first information processing apparatus.

10. The first information processing apparatus according to claim 1, wherein the second right indicates permission of an access to the document in the second area, and wherein the first right indicates restriction of the access to the document in the third area.

11. The first information processing apparatus according to claim 10, wherein the document comprises a plurality of pages, wherein the operation history indicates one or more of the plurality of pages, and wherein the access comprises displaying at least one of the plurality of pages not indicated by the operation history.

12. The first information processing apparatus according to claim 1, wherein the display displays in the third area a third thumbnail, shared from a second user, along with the first thumbnail and the second thumbnail, and wherein the first user and the second user each have less access to the third thumbnail in the third area than the second user has access to the third thumbnail on a second display at a third information processing apparatus from which the third thumbnail is shared by the second user.

13. The first information processing apparatus according to claim 12, wherein the third area identifies respective ones of the first user, the second user and the person concerned who respectively shared ones of the first thumbnail, the second thumbnail and the third thumbnail.

* * * * *